Figure 1:
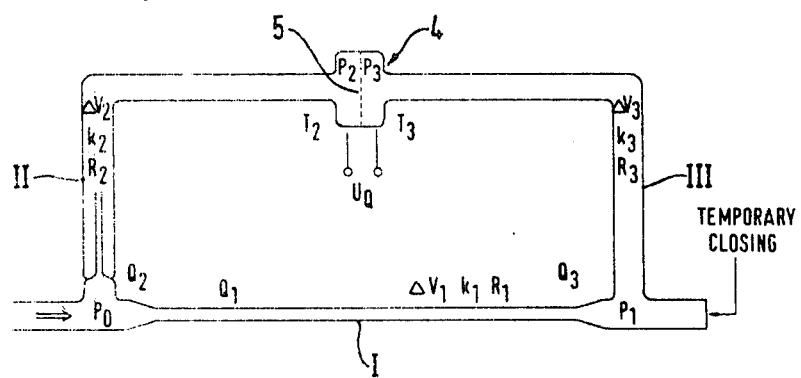

United States Patent [19]

Grände

[11] 4,240,294
[45] Dec. 23, 1980

[54] FLOW METER

[76] Inventor: Per-Olof Grände, s:t Petri Kyrkogata 15, S-222 21 Lund, Sweden

[21] Appl. No.: 970,091

[22] Filed: Dec. 15, 1978

[30] Foreign Application Priority Data

Dec. 16, 1977 [SE] Sweden ................................. 7714338

[51] Int. Cl.³ ................................................ G01F 1/38
[52] U.S. Cl. ............................ 73/861.47 R; 73/861.52
[58] Field of Search ....................... 73/205 R, 707, 182

[56] References Cited

U.S. PATENT DOCUMENTS

| 3,994,166 | 11/1976 | Dower | 73/205 |
| 4,096,746 | 6/1978 | Wilson et al. | 73/205 |

Primary Examiner—Herbert Goldstein
Attorney, Agent, or Firm—Schwartz, Jeffery, Schwaab, Mack, Blumenthal & Koch

[57] ABSTRACT

A flow meter for the registration of pulsating liquid flows, and preferably for registration of small blood flows. The flow is measured by means of a differential pressure measurement over a first flow resistance (I) having a resistance $R_1$. The flow meter includes a high pressure part in the form of a flow resistance (II) and a lower pressure part in the form of a flow resistance (III), and these have the resistances $R_2$ and $R_3$, respectively. The resistances $R_1$, $R_2$ and $R_3$ are selected so as to adjust the pressures on each side of the differential pressure meter in phase with each other independent of the frequency of the flow pulsations. Each resistance has a corresponding modulus of elasticity, and the resistances and moduli of elasticity are so related as to fulfill certain formulas.

15 Claims, 7 Drawing Figures

FLOW METER

The present invention relates to a flow meter for registration of fluctuating liquid flows, preferably for registration of small flows, for instance blood flows in connection with animal experiments at which the flow meter measures the flow by means of differential pressure measurement over a fixed flow resistance and therefore comprises a high pressure part and a low pressure part.

At the registration of pulsating blood flows on the artery or vein part up till now generally electromagnetic flow meters have been used. These, however, are inconvenient to use for the measurement of small flows, for instance in the order of ($<$10 ml/min) on account of an all too great base line drift which causes a very poor accuracy at said flow quantities. On the vein part also droppers are used as blood flow meters, but the accuracy is very poor.

The purpose of the present invention is to bring about an exact and continuous flow registration of a pulsative liquid flow independent of the frequency of the pulsations, above all within the small-flow range and not only a possibility of registration of the average flow of pulsatile flow.

According to the invention this in the main is achieved in that the resistances $R_1$, $R_2$ and $R_3$ of the flow meter and its moduli of elasticity $k_1$, $k_2$ and $k_3$ (reference numerals according to FIG. 1) are adjusted according to the formula $$R_2/k_2 = (R_3 + R_1)/k_3$$

in which $1/k_1$ approximately equals to 0, that is, the material of the flow resistance material is inelastic.

Figure 2:
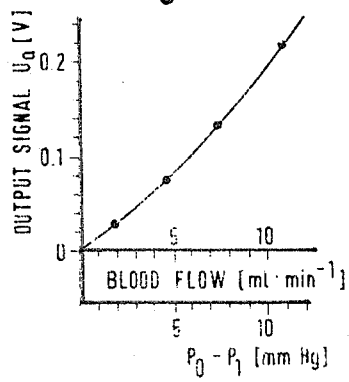
Figure 3:
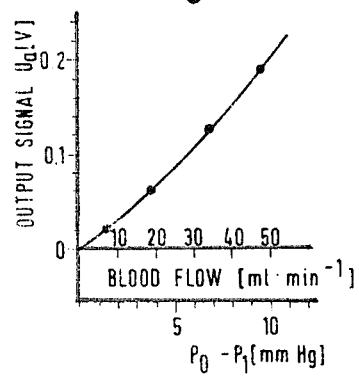
Figure 4:
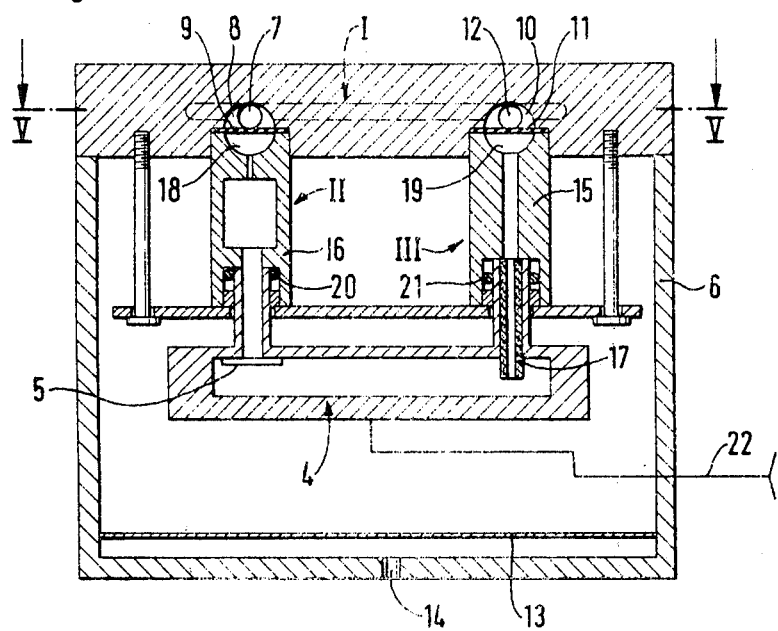
Figure 5:
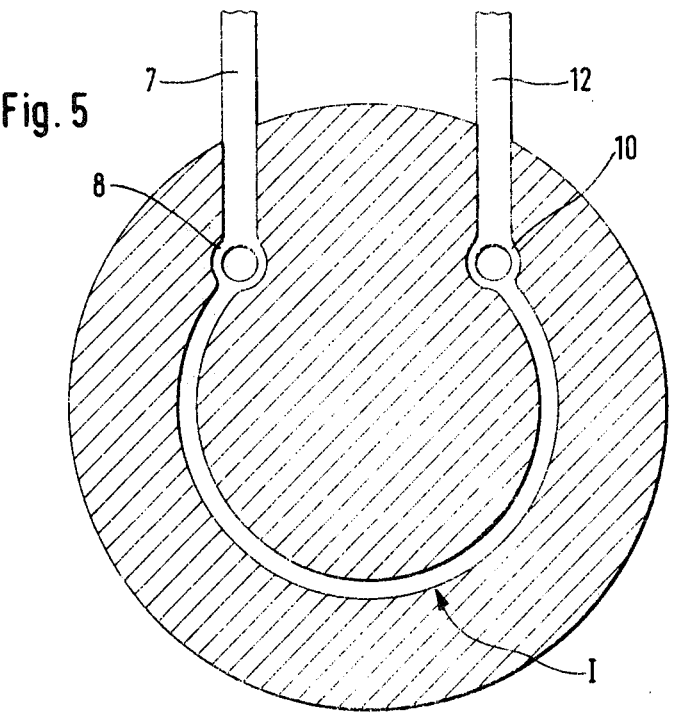
Figure 6:
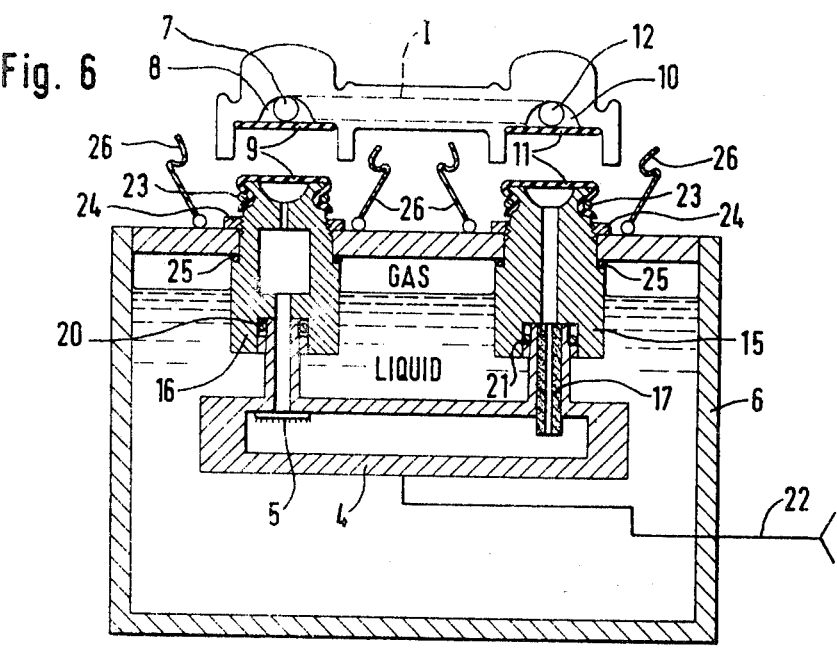
Figure 7:
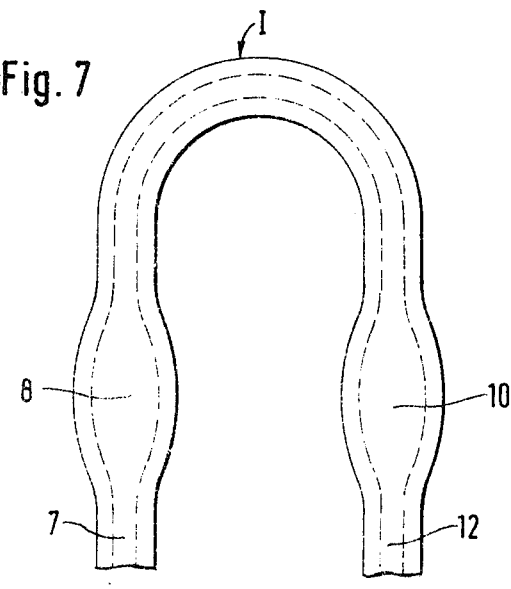

In the following the invention will be more exactly described with reference to the accompanying drawings in which FIG. 1 schematically illustrates a flow meter according to the invention, FIGS. 2 and 3 show calibration curves for two types of flow meters according to the invention, FIG. 4 is a sectional view of a flow meter according to the invention, and FIG. 5 is a sectional view on the line V—V in FIG. 4, whereas FIGS. 6 and 7 show an alternative construction which is particularly suited for blood flow measurement for clinical purpose.

The main principle of the flow meter according to the invention is schematically illustrated in FIG. 1. It consists of a main tube (I) conducting the blood flow (Q) through the flow meter. The pressure drop across the tube I is measured by means of a differential pressure meter 4 having practically no "displacement" (National Semiconductor Corp., LX1601DD) via tubes II and III, the former being shaped with an inner conduit of a smaller size for a purpose which will later be described. It is important that the pulse pressure at the entrance of the tube II is transferred to each side of the differential pressure meter without any considerable phase shift. This means that the time constant ($T_2$) for the tube II shall be identical with the time constant ($T_3$) for the tubes I+III which can be brought about by adopting of suitable values for the three tube resistances $R_1$, $R_2$ and $R_3$ and the moduli of elasticity $k_1$, $k_2$ and $k_3$ thereof in accordance with the following calculation. Since the time constants are independent of the flow, the calculation refers to a situation with the average flow to be zero which is obtained by temporary closing of the outlet (FIG. 1). The pulse pressure then will cause smaller flows $q_1$, $q_2$ and $q_3$ through the three tubes I, II and III of the flow meter. $p_0$, $p_1$, $p_2$ and $p_3$ indicate the pressures in the positions in FIG. 1, $\Delta V_1$, $\Delta V_2$ and $\Delta V_3$ the pressure inducing volume alterations of the tubes I, II and III, and $k_1$, $k_2$ and $k_3$ the moduli of elasticity thereof. By that, $dp = k_1 dV$; $dp_2 = k_2 dV_2$; $dp_3 = k_3 dV_3$ and $dV_1/dt = q_1 - q_3$; $dV_2/dt = q_2$; $dV_3/dt = q_3$.

The relationship between flow, resistance and pressure drop for the three tubes can be expressed as follows:

$$q_1 R_1 = p_0 - p_1;\ q_2 R_2 = p_0 - p_2;\ q_3 R_3 = p_1 - p_3;$$

If $1/k_1 \approx 0$ (that is, the tube I is rigid) the above equations after Laplace's transformation, will give the following solutions:

$$P_2 = P_0 \frac{1}{1 + \frac{R_2}{k_2 s}} = P_0 \frac{1}{1 + T_2 s};$$

$$P_3 = P_0 \frac{1}{1 + \left(\frac{R_3}{k_3} - \frac{R_1}{k_3}\right)s} = P_0 \frac{1}{1 + T_3 s};$$

and therefore $$T_2 = \frac{R_2}{k_2};\ T_3 = \frac{R_3 + R_1}{k_3}$$

Thus, if $k_2$ and $k_3$ are identically shaped, the relationship $T_2 = T_3$ is valid when $R_2 = R_1 + R_3$. As appears, this will apply for all s, that is for all frequencies.

The flow meter is designed according to the above rule. The relationship $k_2 = k_3$ was obtained by shaping the tube II (outer tube) and the tube III in equal size and of the same material. The relationship $R_2 = R_1 + R_3$ was obtained by mounting the smaller conduit within the tube II with a resistance equal to $R_1$. It is obvious that the pressure-sensitive portion 5 of the differential pressure meter must operate without any considerable displacement, a rule which is fulfilled by means of the seclected piezo-resistive differential pressure meter (National Semiconductor Corp., LX1601DD). The tubes II and III are filled with a low-viscous fluid, i.a. in order to avoid pockets of trapped air. In order to also avoid short-circuiting and by that a damage of the pressure meter, the interior thereof is filled with said quite inert electrolyte-free fluid FC (40-85) (BM Brand inert fluorochemical Liquids Chemical Division 3M Company). With this design in the main any phase shift between $P_2$ and $P_3$ (FIG. 1) did not arise, as appears from the absence of pulse pressure oscillations at zero-flow with outer closure. The pressure meter was hermetically enclosed together with said inert liquid in order to avoid damages by contact with electrolytes and interference by change of the outer temperature. In this way the inert liquid protects the laser-trimmed resistances positioned on the outside of the pressure meter.

The size of the resistance in the tube I, $R_1$ (and therewith also $R_2$) can be varied within a wide range. The selected value is dependent on the range within which the flow is to be measured and on the upper limit of the acceptable arterial blood pressure drop across the tube and on the sensitivity and precision of the differential pressure meter. $R_1$ must be as small as possible in order to limit the pressure drop across the flow meter. This above all applies to measurement of blood flow. With the present construction of the selected differential pressure meter, intended for blood flow measurement, flows within the range <50 ml/min can be correctly measured for a pressure drop across the flow meter of <10 mm/Hg.

In FIGS. 2 and 3 are shown calibration curves for two types of a blood flow meter, a first one having a relatively high $R_1$ for measurement in the lower flow range (the length of the tube I being 85 mm, the inner diameter being $\approx 1.15$ mm), and a second one having a lower $R_1$ for larger flows (the length of the tube I being 85 mm, the inner diameter being 1.75 mm). The blood flow (for calibration purpose measured by means of graduated glass) is ticked off relatively to the output signal ($U_Q$) from the differential pressure meter. Along the abscissa is also ticked off the pressure difference across the tube $I(p_0-p_1)$. It appears that the non-linearity for blood is very modest. This fact also indicates that viscosity alternations in the blood within these speed ranges are of less importance. The present construction of the flow meter provides a base line drift/hour <2% of the deviation at full scale, corresponding to a maximum pressure drop of 10 mm Hg across the flow meter is standardized circumstances with a relatively constant ambient temperature and constant blood viscosity.

The flow meter according to FIGS. 4 and 5 may be provided with an outer respectacle 6 in which the differential pressure meter 4 is mounted. The liquid via the inlet 7 enters a somewhat widened portion 8 which is shielded from the high pressure side II by means of a very thin movable membrane 9, preferably of siliconized latex rubber for blood flow measurement. The tube, corresponding to I, extends from the widened portion 8 as an arch (not shown in the drawing) to a similar widened portion 10 which is shielded from the low pressure side III via a similar membrane II. The liquid flows out of the flow meter via the outlet 12 which is connected with the widened portion 10. The whole flow passage from inlet to outlet 12 preferably is moulded in one unit. At the feeding of blood flow this moulding should be made in a blood-minded material without sharp unevenesses damaging the blood-corpuscles.

The use of the flow meter for blood flow measurement for clinical purposes, for instance blood flow measurement at kidney dialysis or blood flow measurement in the use of a heart-lung-machine etc., will require another design considering requirements for sterility and requirements for an easy interchangeability of the material contacting the blood vessel (possibly of disposable type). FIG. 6 illustrates how such a flow meter can be constructed. The flow resistance (1) shown in FIG. 7 is designed as an easily interchangeable unit, the inner surface of which contacts the blood, is covered with a thin layer of silicon rubber. The counterpart of the membrane 9 and 11 in FIG. 4 has double walls, the membrane wall contacting the blood vessel being comprised in the flow resistance portion (1) and the other membrane wall being attached to the intermediate pieces 15 and 16 in FIG. 6 by means of an O-ring 23. The intermediate pieces are screwn on the top by means of nuts 24 and sealed against the top by means of an O-ring 25. The flow resistance (I) is easily mountable by means of a fastening device (26) and can therefore be easily replaced, at which the flow resistance (I) may be disposable.

Differential pressure meters having a great accuracy of measurement may be sensitive partly to temperature variations and partly to outer and inner influence of ion-containing solutions, such as for instance ordinary water or blood. In order to eliminate these problems both the outer receptacle 6 and the interior of the pressure meter is provided with the inert liquid (FC 40-85). By means of suitable positioning of the flow meter it is avoided that liquid is mixed with blood at a possible membrane damage since the suggested inert liquid is many times heavier than water and blood.

Pressure alterations caused by temperature variations in the outer receptacle 6 may be eliminated either in that the respectacle has an elastic wall portion 13 which alters its shape with volume variations so that the pressure in the outer receptacle 6 remains constant. The outer receptacle 6 has an opening 14 which without resistance permits an alteration of the shape of the wall portion 13. This solution is shown in FIG. 4. Alternatively the outer receptacle 6, besides a liquid, may contain a smaller quantity of gas. Since the gas is easily compressible the pressure may be maintained approximately constant despite the volume alteration of the liquid with the temperature. This solution is shown in FIG. 6.

The inert liquid in the pressure meter alters its volume with temperature variations causing different expansion of the membranes 9 and 11 so that a substantial base line drift may arise. In order to eliminate this effect when one pressure part of the pressure meter has a considerably larger volume than the other pressure part thereof, the total space of the high pressure part II and the space of the low pressure part III have been made equal large by volume.

The equal volumes of the high pressure and low pressure part spaces II, III preferably is obtained by means of intermediate pieces 16, 15 with a large and a smaller inner volume, respectively, and in that the originally relatively much larger volume of the low pressure part space III moreover has been reduced by means of a pierced insert 17 mounted in the own low pressure coupling tube of the pressure meter 4, said insert 17 preferably having a good heat conductivity in order to obtain an equilibrium temperature as fast as possibly.

In order to bring about a constructively simple and simultaneously effective design desired resistances may be obtained by means of intermediate pieces 16, 15 having depressions 18, 19 for membranes 9, 11 actuated by the flow the pressure of which is to be measured.

In order to avoid at blood flow measurement the formation of blood pockets where the blood may be stopped and clot on peril of emboli and cause cleaning problems the membranes 9, 11 may be arranged in the blood flow so that they are continuously flushed by the flowing blood and that sharp edges and a turbulence-generating shape is avoided. The membranes should be thin, elastic and made of a material standing blood contact.

Components being parts of the flow meter but less important for the invention have not been shown or described. However, it should be mentioned that the inserts 16, 15 are screwn on the tube of the pressure meter and that they have sealing rings 20, 21 for sealing against surrounding walls. The differential pressure meter 4 is connected with an electrical power source and a registration apparatus (not shown) by means of a cable 22. As shown in the drawing the two flow meters in FIGS. 4 and 6 illustrate two different ways to fix the pressure meter.

The flow meter according to the invention preferably may be used for measuring other flows than blood flows, in other words, the invention is not limited to the embodiments exemplified above and shown in the drawings but can be modified within the scope of the following claims.

Finally it should be mentioned that the liquid in the receptacle 6 preferably has a temperature buffer effect. In order to prevent that radiation heat causes a temperature drift the outer receptacle may be heat insulated and have reflecting surfaces.

The illustrated and described flow meter as mentioned is suitable for the measurement of fluctuating fluids of all kinds, i.e. also gasoline. The flow meter for instance may be used for continuous gasoline flow measurement in vehicles at which the obtained flow signal, by means of an analog divider, may be divided with a signal proportionel to the speed of the vehicle, by which the consumption of gasoline may be continuously registered as consuption per way unit.

I claim:

1. A flow meter for the registration of pulsating liquid flows, preferably for registration of small blood flows, the flow being measured by means of a differential pressure measurement over a first flow resistance (I) with the resistance $R_1$, and the flow meter comprising, besides the flow resistance I, also a high pressure part in the form of a flow resistance (II) and a lower pressure part in the form of a flow resistance (III) with the resistances $R_2$ and $R_3$, respectively, wherein the resistances $R_1$, $R_2$ and $R_3$ are selected so as to adjust the pressures on each side of the differential pressure meter in phase with each other independent of the frequency of the flow pulsations, the flow resistances (I), (II) and (III) with the resistances $R_1$, $R_2$ and $R_3$, respectively, having moduli of elasticity $k_1$, $k_2$ and $k_3$, respectively, said factors being adapted to fulfill the following formula $$R_2/k_2 = (R_3 + R_1)/k_3$$

in which $1/k_1$ is approximately equal to zero, that is the flow resistance material in the main is inelastic.

2. A flow meter according to claim 1, including an outer receptacle and a differential pressure meter mounted therein, both the outer receptacle and the interior of the pressure meter containing an inert not electrically conductive liquid having a low viscosity.

3. A flow meter according to claim 2, wherein the inert liquid has another density than water.

4. A flow meter according to claim 2 or 3, wherein the outer receptacle has an elastic wall portion which alters its shape with volume alterations so that the pressure in the outer receptacle remains constant.

5. A flow meter according to claim 2 or 3, wherein the outer receptacle also contains a smaller quantity of gas which compensates for the volume alteration of the liquid by which the pressure in the outer receptacle remains approximately constant.

6. A flow meter according to claim 1, 2 or 3 wherein the high pressure part (II) in the main has a volume which is equal to that of the low pressure part (III).

7. A flow meter according to claim 6, wherein the equal volume of the high pressure part and low pressure part (II, III) has been obtained by means of intermediate pieces with a large and a smaller, respectively, inner volume, the pressure part originally having the largest volume moreover having been reduced by means of a pierced insert mounted in a coupling tube of that part, which tube extends to the pressure meter, said insert preferably having a good heat conductivity.

8. A flow meter according to claim 1, 2 or 3 wherein the desired resistances are obtained by means of intermediate pieces which have depressions for membranes in contact with the flow, the pressure of which should be measured.

9. A flow meter according to claim 8, wherein the membranes transferring the pressure from the flow path to the differential pressure meter are double-walled, the membrane wall contacting the blood vessel being a part of the flow resistance (I).

10. A flow meter according to claim 8, wherein the membranes are elastic and at measurement of the blood flow the membrane walls positioned in the blood flow also consist of a blood-minded material, such as for instance siliconized-rubber.

11. A flow meter according to claim 1, 2 or 3 wherein the flow meter is for measurement of blood flow and wherein the inner surface of flow resistance (I) comprises a blood-minded material, for instance silicon-rubber, and is shaped without unevenesses damaging to the blood during the flowing thereof.

12. A flow meter according to claim 11, wherein flow resistance (I) forms a mountable part thereof.

13. A flow meter according to claim 2 wherein the receptacle is heat insulating and has a reflecting surface.

14. A flow meter according to claim 2, wherein the inert liquid in the outer receptacle has a temperature buffer capability.

15. A flow meter for the registration of pulsating liquid flows, preferably for registration of small blood flows, the flow being measured by means of differential pressure measurement over a first flow resistance (I) with the resistance $R_1$, and the flow meter comprising, besides the flow resistance (I), also a high pressure part in the form of a flow resistance (II) and a low pressure part in the form of a flow resistance (III) with the resistances $R_2$ and $R_3$, respectively, and wherein the resistances $R_1$, $R_2$ and $R_3$ are selected so as to adjust the pressures on each side of the differential pressure meter in phase with each other independent of the frequency of the flow pulsations the flow resistances (I), (II) and (III), with the resistances $R_1$, $R_2$ and $R_3$, respectively, having moduli of elasticity $k_1$, $k_2$ and $k_3$, respectively which are adapted to fulfill the formula $$R_2 = R_1 + R_3$$

if $$k_2 = k_3$$

in which $1/k_1$ is approximately equal to zero, that is the flow resistance material in the main is inelastic.

* * * * *